(12) United States Patent
Mechand

(10) Patent No.: X3553
(45) Date of Patent: Jul. 10, 1822

(54) POWER,SAFETY ENGINE

(76) Inventor: Louis Mechand

DRAFTSMAN'S DIVISION.

2—328 a.

All communications should be addressed to "The Commissioner of Patents, Washington, D. C."

DEPARTMENT OF THE INTERIOR,

United States Patent Office.

Washington, D. C., ________, 189_

SIR:

The printed copis of Patent No. L. Marchand July 10, 1822 are exhausted.

As soon as reprinted a copy will be mailed you to complete your order.

By direction of the Commissioner:

Very respectfully,

________ Chief Clerk.

314356-97-5m